United States Patent [19]
Kawase et al.

[11] Patent Number: 5,245,187
[45] Date of Patent: Sep. 14, 1993

[54] MICROTIP, PROCESS FOR PREPARATION THEREOF, SURFACE-OBSERVING APPARATUS AND INFORMATION-TREATING APPARATUS EMPLOYING THE SAME

[75] Inventors: Toshimitsu Kawase; Osamu Takamatsu, both of Atsugi; Katsunori Hatanaka, Yokohama; Katsuhiko Shinjo, Isehara, all of Japan

[73] Assignee: Canon Kabushiki Kaisha, Tokyo, Japan

[21] Appl. No.: 841,519

[22] Filed: Feb. 26, 1992

[30] Foreign Application Priority Data

Feb. 26, 1991 [JP] Japan ................. 3-053093
Jul. 9, 1991 [JP] Japan ................. 3-193564

[51] Int. Cl.⁵ .............................. G01B 5/28
[52] U.S. Cl. ................... 250/306; 250/307; 156/647; 369/126
[58] Field of Search ......... 250/306, 307; 156/647, 156/637; 252/79.1; 369/126

[56] References Cited

U.S. PATENT DOCUMENTS

| | | | |
|---|---|---|---|
| 4,396,459 | 8/1983 | Herning et al. | 252/79.1 |
| 4,470,875 | 9/1984 | Poteat | 156/647 |
| 4,668,865 | 5/1987 | Gimzewski et al. | 250/306 |
| 4,670,092 | 6/1987 | Motamedi | 156/647 |
| 4,685,996 | 8/1987 | Busta et al. | 156/647 |
| 4,943,719 | 7/1990 | Akamine et al. | 250/306 |
| 4,998,016 | 3/1991 | Nose et al. | 250/306 |
| 5,021,364 | 6/1991 | Akamine et al. | 250/306 |
| 5,051,379 | 9/1991 | Bayer et al. | 250/306 |
| 5,066,358 | 11/1991 | Quate et al. | 250/306 |

FOREIGN PATENT DOCUMENTS

0309236 3/1989 European Pat. Off. .
3-150300 6/1991 Japan .

OTHER PUBLICATIONS

"Titanium Carbide Single-Crystal Tips for High-Resolution Scanning Tunneling Microscopy" by Masanori Yata et al.; Japanese Journal of Applied Physics, vol. 28, No. 5, May 1989 Part 2, Tokyo, Japan pp. 885-887.
"Improved atomic force microscope images using microcantilevers with sharp tips" by S. Akamine et al.; Applied Physics Letters, vol. 57, No. 3 Jul. 16, 1990 New York, U.S. pp. 316-318.
"STM Observation of Surface Atomic Images using a TiC Crystal Tip" by M. Yata et al., Shinku vol. 31, No. 5 (1988).

Primary Examiner—Paul M. Dzierzynski
Assistant Examiner—Kiet T. Nguyen
Attorney, Agent, or Firm—Fitzpatrick, Cella, Harper & Scinto

[57] ABSTRACT

A microtip has a tip portion formed by gathering of three crystal faces of a single crystal, at least one of the crystal faces being an etched face at and around the tip portion. The microtip is produced by breaking and splitting a single crystal by applying a stress, and subjecting the face formed by breaking of the single crystal to anisotropic etching by utilizing facial orientation, thus forming a tip portion as a gathering point of three crystal faces of the single crystal. A surface-observing apparatus for observing a surface of a specimen and an information-treating apparatus comprise a tip in proximity to the specimen to be observed or a recording medium, and conduct the surface observation or the writing or reading by using the tip, respectively.

10 Claims, 5 Drawing Sheets

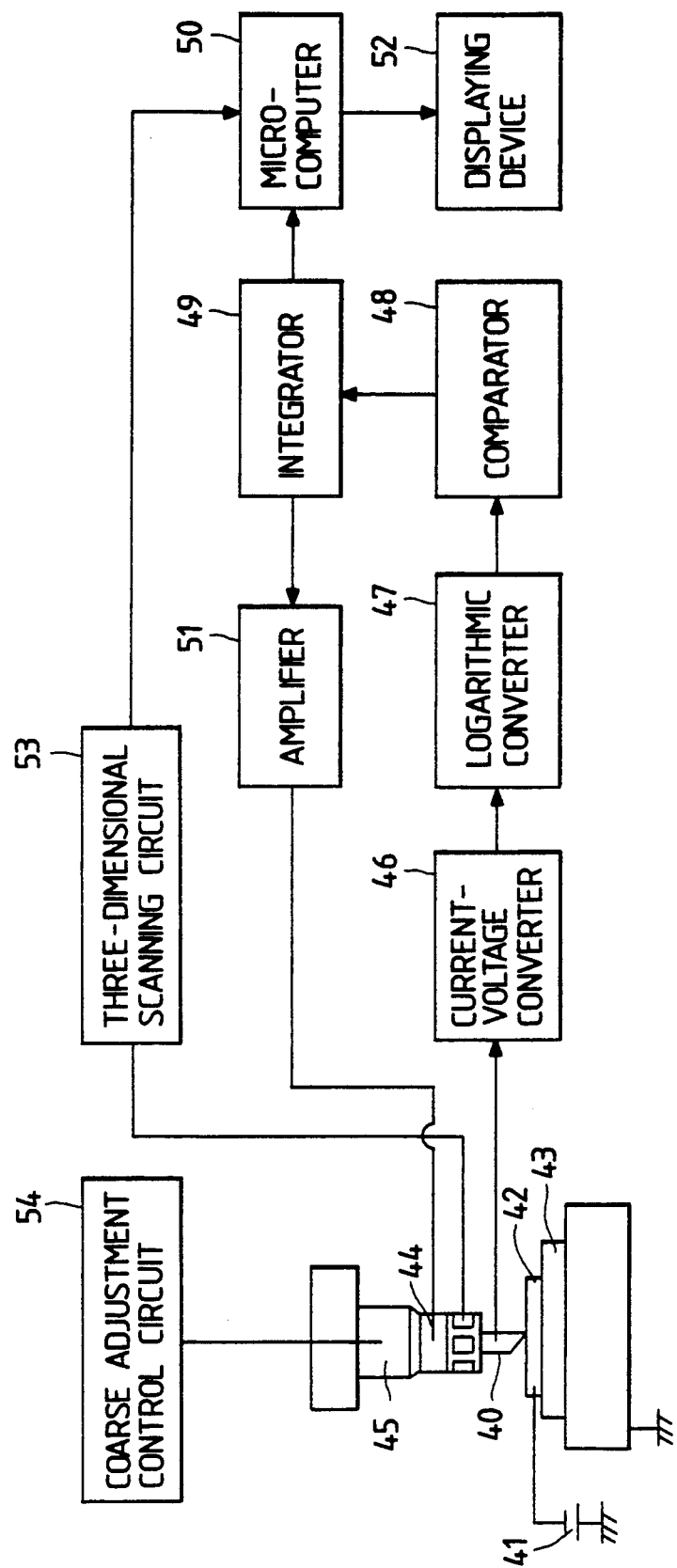

MICROTIP, PROCESS FOR PREPARATION THEREOF, SURFACE-OBSERVING APPARATUS AND INFORMATION-TREATING APPARATUS EMPLOYING THE SAME

BACKGROUND OF THE INVENTION

1. Field of the Invention

The present invention relates to a microtip employed in a surface-observing apparatus such as a scanning tunneling microscope (hereinafter referred to as STM) and a high-density recording-reproducing apparatus for detecting electric current, extremely small force, and the like. The present invention also relates to a process for preparing the microtip, and a surface-observing apparatus and a high density recording-reproducing apparatus employing the microtip.

2. Related Background Art

Microtip used in STM or the like are mostly prepared conventionally from material such as a tungsten wire or platinum wire by mechanical grinding by means of a diamond drill or the like, or electrochemical etching, in a shape of a sharp tip. Recently, a cleavage method has been reported which utilizes the properties of a single crystal material (Yada, et al.: "Observation of Surface Atomic Image with a Scanning Tunneling Microscope, and Material of Tip Therefor", Shinku (Vacuum) Vol. 31, No. 5, 1988).

The prior art techniques of producing the microtips have disadvantages below:

1. Electrochemical etching causes formation of an oxide film on the surface of the tip, which makes it impracticable to measure precisely a minute tunneling current in STM. Moreover, this method provides a microtip having low mechanical rigidity owing to the small solid angle of the tip.

2. Mechanical grinding is liable to apply excessive stress to the material and is not satisfactory in control of the shape of the tip because of the mechanical cutting.

3. The cleavage method does not always give the desired sharp solid angle, and is not sufficient in reproducibility in the production.

4. The microtips produced according to the above prior art techniques, do not exhibit stability and reliability in image observation, writing, and reading when they are used for a surface-observing apparatus or a recording-reproducing apparatus.

SUMMARY OF THE INVENTION

The object of the present invention is to offset the disadvantage of the prior art, and to provide a microtip without formation of an oxide film in production thereof without lowering rigidity, and doing so in such manner as to provide a sharp tip with sufficient reproducibility.

According to a first aspect of the present invention, there is provided a microtip having a tip portion formed by gathering of three crystal faces of a single crystal, at least one of the crystal faces being an etched face at and around the tip portion.

According to a second aspect of the present invention, there is provided a microtip produced by breaking and splitting a single crystal by giving a stress, and subjecting the face formed by breaking of the single crystal to anisotropic etching by utilizing facial orientation, thus forming a tip portion as a gathering point of three crystal faces of the single crystal.

According to a third aspect of the present invention, there is provided a surface-observing apparatus for observing a surface of a specimen, comprising a tip placed in proximity to the specimen to be observed, and conducting the surface-observing by moving relatively the tip and the specimen three-dimensionally while detecting tunneling current flowing between the tip and the specimen, or detecting an interatomic force exerted between the tip and the specimen, the apparatus being provided with the microtip of the first aspect or the second aspect mentioned above of the present invention.

According to a forth aspect of the present invention, there is provided an information-treating apparatus for writing information onto or reading information from a recording medium, comprising a tip placed in proximity to the recording medium, and conducting the writing or reading by utilizing a tunnel current flowing between the tip and the specimen, or utilizing an interatomic force exerted between the tip and the specimen, the apparatus being provided with the microtip of the first aspect or the second aspect mentioned above of the present invention.

BRIEF DESCRIPTION OF THE DRAWINGS

FIG. 4 explains a surface-observing apparatus described in Example 3.

DESCRIPTION OF THE PREFERRED EMBODIMENT

Figure 1:
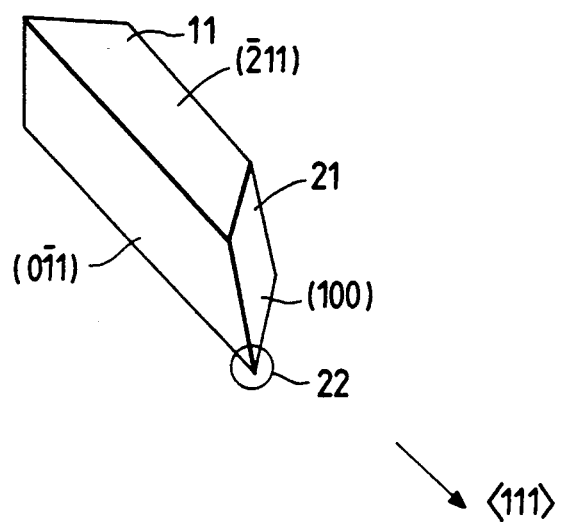
FIG. 1 explains a microtip of the present invention.

In the first aspect of the present invention, a microtip is provided which has a tip portion formed by gathering of three crystal faces of a single crystal, at least one of the crystal faces being an etched face.

In the second aspect of the present invention, a microtip is produced by breaking and splitting a single crystal by applying a stress, and subjecting the face formed by breaking of the single crystal to anisotropic etching by utilizing facial orientation thus forming a tip portion as a gathering point of three crystal faces of the single crystal.

In the third and the fourth aspects of the present invention, the aforementioned microtip is employed in a surface-observing apparatus or an information-treating apparatus.

The single crystal matter in the present invention is preferably a single crystalline carbide, specifically titanium carbide, tungsten carbide, silicon carbide, or the like.

The tip portion of the microtip of the present invention is formed as a corner of three gathering faces.

The three faces of the microtip of the present invention are respective crystal faces. The preferred examples of the combination of the three crystal faces are the planes (211), (110), and (100); the faces (211), (110), and (010); and the faces (211), (110), and (001).

Of the aforementioned three crystal faces, at least one face has an etched face at and around the tip portion.

The etched face is formed in a single face, namely on the same plane, thereby ensuring the reproducibility of the sharpness of the tip portion.

The one of the crystal faces constituting the tip portion may be etched wholly. However, the sharpness of the tip portion is achievable with reproducibility, if the etched face covers the tip and vicinity thereof. At least one of the three crystal faces constructing the tip portion needs to be in an etched state at least at and around the tip. The other one or two crystal faces may also be in an etched state. Naturally, the one or two crystal faces may be a wholly etched face.

The aforementioned microtip can be derived by anisotropically etching a breaking face of the broken and split single crystal. The anisotropic etching is conducted by utilizing the orientation of the single crystal, either on the entire of the breaking face or on a tip and vicinity thereof. The anisotropic etching may also be practiced either on only one of the three faces or on two or three thereof.

The etching may be practiced either by a dry process or by a wet process.

In the wet process of the etching, examples of a useful etchant are shown below. For single crystal of titanium carbide, the useful etchant includes a mixture of HF, $HNO_3$ and $H_2O$ in a ratio of 1:1:1; a mixture of HF, $HNO_3$ and glycerin in a ratio of 1:1:1; a mixture of $HNO_3$, HCl and $H_2SO_4$ in a ratio of 1:1:1; a mixture of $HNO_3$, HF and $H_2SO_4$ in a ratio of 1:1:1, and so forth. For single crystal of tungsten carbide, the useful etchant includes a mixture of HCl and $H_2O$ in a ratio of 1:1, and the like.

In the dry process of etching, the useful etching gas for sputtering includes argon, chlorine, dichlorodifluoromethane, tetrachloromethane, tetrafluoromethane, and the like.

The practice of the anisotropic etching utilizing the orientation of the single crystal will provide a flat face constituted of a single crystal face, giving the sharpness of the tip portion covered by this plane.

The surface-observing apparatus of the present invention employing the microtip of the present invention includes STM in which the surface of a specimen is observed by moving the tip and an observed specimen relatively in a plane direction with the tip held at the position to keep constant the tunnel current flowing between the tip and the specimen, and measuring the change of the vertical shift of the tip. Further, atomic force microscopy (AFM) is also included in the surface-observing apparatus of the present invention: the AFM in which a tip is vertically shifted so as to keep constant the atomic force between the tip and the specimen instead of keeping constant the above tunnel current.

The information-treating apparatus of the present invention employing the microtip of the present invention includes the apparatuses which are based on the principle of the STM or AFM and read out information recorded in a recording layer of a recording medium, and record or erase the information.

EXAMPLE 1

Titanium carbide was used as the material of the single crystal 11, which has orientation of <111> in the major axis direction, and is surrounded by planes of (211), and (011) as shown in FIG. 1 (three planes are not shown in the drawing). The used titanium carbide material had a cross-sectional area of 0.3 mm × 0.3 mm and a length of 10 mm. This titanium carbide material was broken and split (or cleaved) into two pieces by hand, thereby being cleaved at the (100) plane as shown in FIG. 1. However, because of non-uniform stress during the cleavage, the sharp tip was not formed which has a radius of curvature in the nanometer order required for microtips for STM and the like.

Thereupon, the (100) plane of the cleaved material was etched by a wet process by use of the etchant composed of a mixture solution of hydrofluoric acid, nitric acid and water (composition: $HF:HNO_3:H_2O = 1:1:1$). The wet etching process is described below.

The hydrofluoric nitric acid solution was prepared in a stoppered polyethylene bottle. The material with a support made of teflon was put into the solution to etch the breaking face. The material was left standing in the solution for three days in the stoppered polyethylene bottle. The etching rate of the titanium carbide single crystal was 1 μm per hour standing in the hydrofluoric nitric acid system. The etching time could be shortened, if desired, by stirring or heating.

Figure 2:
FIG. 2 shows a scanning electron microscope of the tip of a tip formed by anisotropic etching.

The microtip completed as above is shown in FIG. 2. As the result of anisotropic etching, the etched faces 21 were formed by retaining exactly the crystal face of the single crystal 11. The orientation of the etched face was analyzed to be surrounded by three planes of (211), (110), and (100). The tip portion 22 formed by the etched faces 21 was so sharp that the radius of curvature was as small as approximately 20 nm, according to observation with scanning electron microscopy.

EXAMPLE 2

Figure 3:
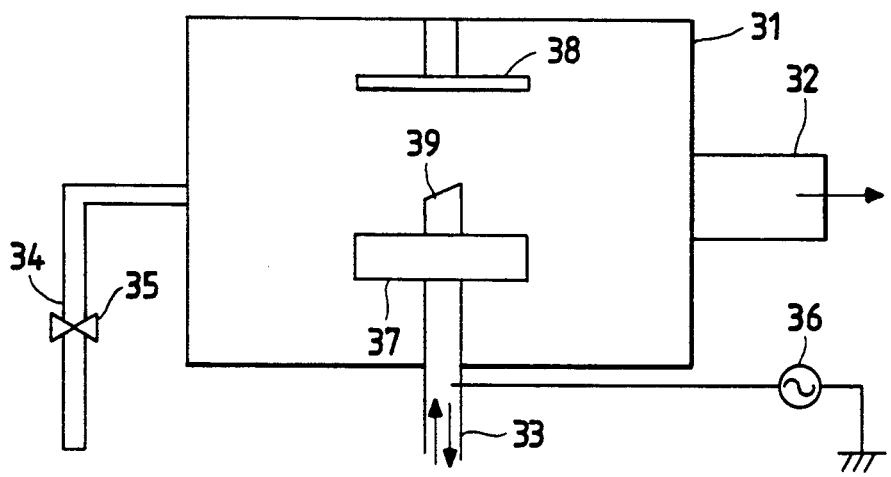
FIG. 3 is a schematic diagram of a reactive ion etching apparatus.

FIG. 3 illustrates an outline of an apparatus for reactive ion etching (hereinafter referred to as "RIE"), the apparatus comprising a vacuum chamber 31, an evacuation opening 32, a cooling, a cooling water line 33, a gas introducing line 34, a gas flow rate-controlling valve 35, a high frequency source 36, a sample holder 37 for holding a single crystal 39 having been cleaved, and a counter electrode 38. In this Example, tungsten carbide was used as the single crystal 39. The preparation conditions are listed below.

| Evacuation pressure: | 4 Pa (Pascal) |
| --- | --- |
| Introduced gas | $CF_4$ |
| Gas flow rate | 10 SCCM |
| Effective power | 150 W |

The single crystal 39 was dry-etched under the conditions above, thereby providing a microtip having a tip surrounded by the planes of (211), (110), and (100) as shown in FIG. 1 and FIG. 2. The curvature radius of the tip of this microtip was 20 nm, and the etching rate was 100 Å/hour.

EXAMPLE 3

An example of an STM apparatus equipped with the microtip of the present invention is described by reference to FIG. 4.

The titanium carbide single crystal tip 40 was prepared by etching by a wet process. The surrounding crystal faces were planes of (211), (110), and (100). The specimen 42 to be observed was prepared by vapor-depositing the molecules of a liquid crystal (10CB) onto HOPG (highly oriented pyrolitic graphite).

The apparatus comprises a sample holder 43, a cylindrical piezoelectric element 44 for fine movement of the tip 40 for three-dimensional scanning, a coarse movement mechanism 45 for bringing the tip 40 close to the specimen 42, a bias source 41, a current-voltage converter 46, a logarithmic converter 47, a comparator 48, an integrator 49, a micro-computer 50, an amplifier 51, a displaying device 52, a three-dimensional scanning circuit 53 for three-dimensional scanning of the cylindrical piezoelectric element 44 for fine movement, and a coarse adjustment control circuit 54 for bringing the tip 40 close to the electrode. The tip 40 is attached to the cyclindrical piezoelectric element 44 for fine movement in such a manner that the angle of the tip of the tip 40 becomes minimum to the scanning direction of the cylindrical piezoelectric element 44.

The surface-observing apparatus of the present invention having the construction as described above was operated in the environmental atmosphere. Electrical feedback signals were given to the cyclindrical piezoelectric element 44 for fine movement through the current-voltage converter 46, the logarithmic converter 47, the comparator 48, the integrator 49, and the amplifier 51 with the bias source 41 being set at the voltage of 100 mV in order to control the tunnel current flowing between the tip 40 and the specimen 42 to be constant at 1 nA. The displacement of the cylindrical piezoelectric element 44 was 1 micrometer per kilovolt. With this electrical feedback being applied, the cylindrical piezoelectric element 44 for fine movement was made to scan by the three-dimensional circuit 53 in such a manner that the tunnel current flowing between the tip 40 and the specimen 42 was kept constant, whereby the molecular image of the surface of the specimen was output to the displaying device 52. The scanning rate of the tip 40 was 2 milliseconds for one line. A clear image of liquid crystal molecules was observed from the output image.

Conventional tungsten tips prepared by electrolytic grinding cause errors in pitch of observed molecules frequently owing to the image distortion at the starting portion of scanning. With the microtip of the present invention, however, no influence was observed such as distortion of the image.

EXAMPLE 4

This example is described by reference to FIG. 5 and FIG. 6. This example describes the application of the single crystal microtip of the present invention to a tip electrode for information treatment.

Figure 5:
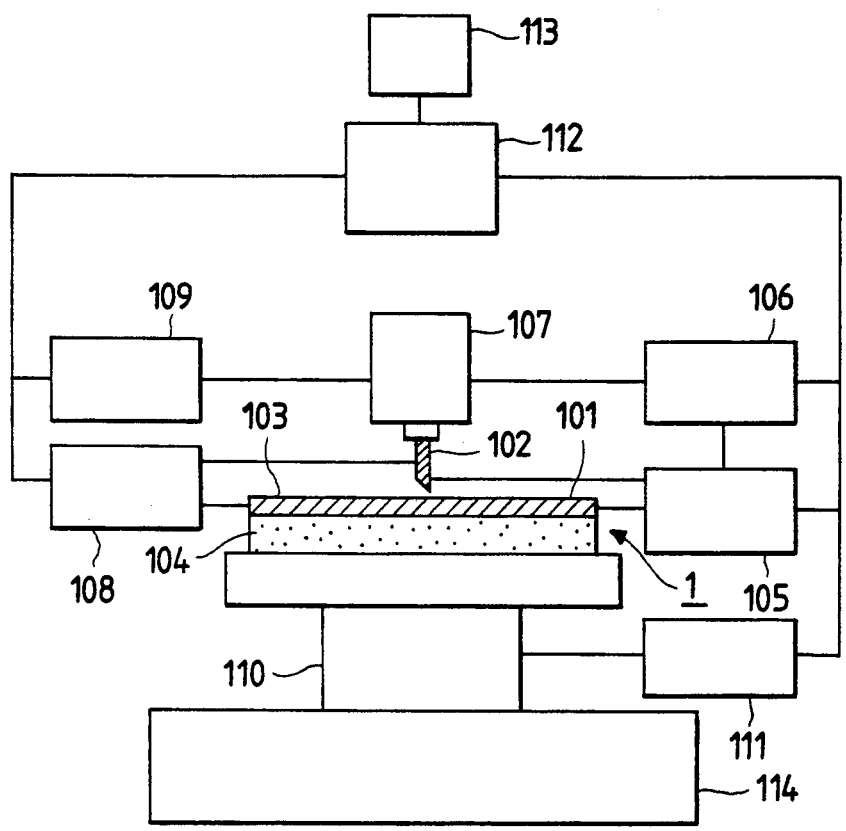
FIG. 5 explains an information-treating apparatus described in Example 4.

FIG. 5 is a block diagram of an information-treating apparatus of the present invention, which has a tip-current amplifier 105, a servo circuit 106 for controlling a fine movement control mechanism 107 employing a piezoelectric element to keep the tip current constant, and a power source 108 for applying a pulse voltage between the tip electrode 102 and the electrode 103 for recording and erasing.

In order to deal with an abrupt change of the tip current on application of the pulse voltage, the HOLD circuit is brought to an ON state to keep constant the output voltage of the servo circuit 106 during the pulse voltage application.

The X-Y scanning drive circuit 109 controls the movement of the tip electrode 102 in X and Y directions. The coarse movement mechanism 110 and the coarse movement driving circuit 111 preliminarily adjust roughly the distance between the tip electrode 102 and the recording medium 1 so as to obtain a tip current of approximately $10^{-9}$ A. These devices are all controlled totally by the microcomputer 112. The apparatus also has a displaying device 113.

The mechanical performance in the movement control by use of a piezoelectric element is as shown below.
  Fine movement control range in Z direction: 0.1 nm to 1 µm
  Coarse movement control range in Z direction: 10 nm to 10 mm
  Scanning range in X-Y directions: 0.1 nm to 1 µm
  Allowances in measurement and control: less than 0.1 nm The example of the present invention is described below.

FIG. 5 shows the information-treating apparatus employed in the experiment. The tip electrode 102 is a titanium carbide tip electrode prepared by a wet process. The distance (Z) between the tip electrode 102 and the recording medium 101 is finely controlled so as to keep constant the tip current flowing between the tip electrode 102 and the recording medium 101 by means of the fine movement control mechanism 107. The fine movement control mechanism is also designed to be capable of controlling finely the movement in the plane direction (or the X-Y directions). Such techniques are known matters. The tip electrode 102 is useful in direct recording, reproduction, and erasing. The recording medium 1 is placed on the X-Y stage 114, and is movable to a desired position. The numeral 103 denotes a substrate electrode, and the numeral 104 denotes a substrate.

An experiment of recording-reproducing-erasing is described below in detail, employing an LB film (composed of 8 layers) of squarylium-bis-6-octylazulene (herein after referred to as "SOAZ") formed on a gold electrode 103.

A recording medium 1 having a recording layer 101 of built-up eight-layers of SOAZ was placed on the X-Y stage 114. The tip electrode was positioned visually and fixed there tightly. A voltage of −1.0 volt was applied to the tip electrode 102 relative to the gold electrode 103, and the distance (Z) between the tip electrode 102 and the recording layer 101 was adjusted by monitoring the electric current. Thereafter, the dependence of the current on the distance (Z) as shown in FIG. 6 was measured by varying the distance (Z) by use of the fine movement control mechanism 107.

The distance (Z) between the tip electrode 102 and the surface of the recording medium 101 can be adjusted by varying the tip current and the tip voltage. However, in order to keep the distance Z constant at an appropriate value, the tip voltage needs to be adjusted so as to obtain the tip current Ip in the range of $10^{-7}$ A $\geq$ Ip $\geq 10^{-12}$ A, preferably $10^{-8}$ A $\geq$ Ip $\geq 10^{-10}$ A.

Figure 6:
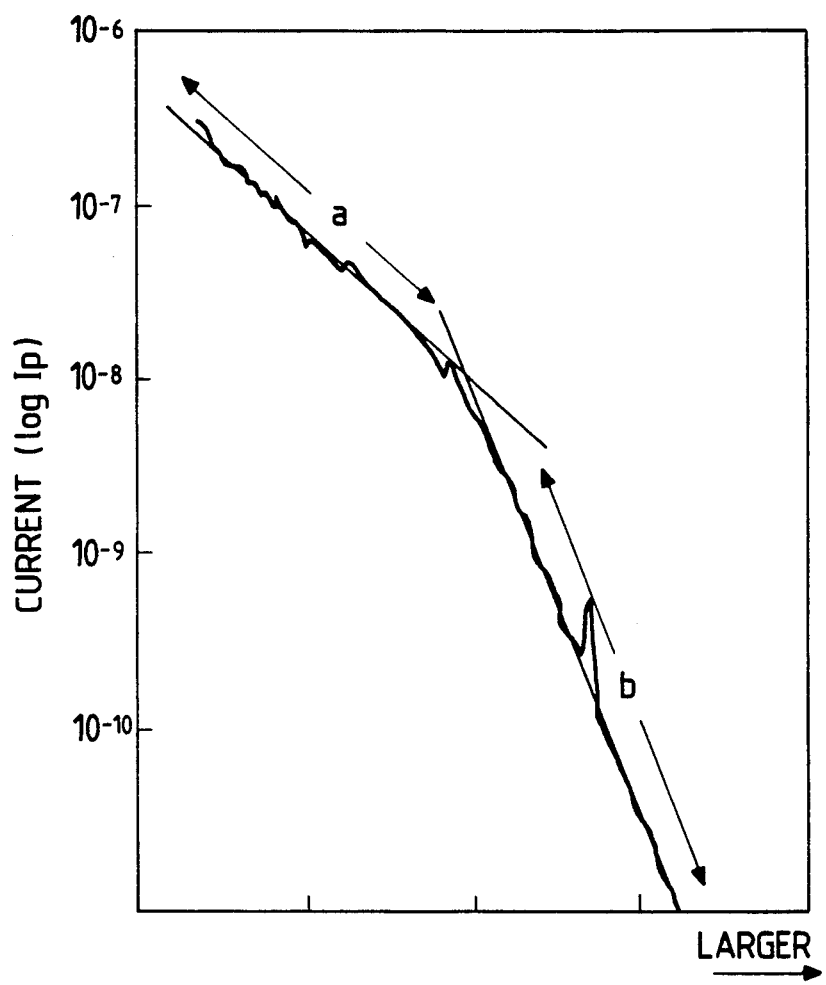
FIG. 6 shows dependence of the tip current on the distance between the tip electrode and the recording layer surface in the information-treating apparatus.

The tip current was set at the level within the "a" region in FIG. 6 ($10^{-7}$ A). Under this condition, the tip electrode 102 was in contact with the recording layer 101. The experiment below was conducted with the output voltage of the servo circuit 106 kept constant. A reading voltage of 0.5 volt was applied between the tip 102 and the gold electrode 103, the reading voltage being not higher than the threshold voltage for causing electric memory effect. As the result, the current measured was not more than µA, which shows the OFF state. Then, a triangle pulse voltage was applied which is not lower than the threshold voltage Vth-ON, for giving an ON state. Subsequently the voltage of 0.5 volt was applied again between the electrodes, and the current of about 0.3 mA was found to flow, which shows an ON state.

Then, a triangle pulse voltage was applied which is not lower than the threshold voltage Vth-OFF where ON state turns to OFF state, for giving an OFF state. Subsequently the voltage of 0.5 volt was applied again between the electrodes, and the current was found to be not more than μA, whereby the return to the OFF state was confirmed.

In another experiment, the tip voltage was set at 0.5 volt, and the tip current Ip was set at $10^{-9}$ A which corresponds to the "b" region in FIG. 6. Thus the distance Z between the tip electrode 102 and the recording layer 101 was controlled.

With the X-Y stage 114 being moved at fixed intervals (1μ), a pulse voltage not lower than the threshold voltage, Vth-ON (Vmax=−15 V), was applied to write the ON state. The output voltage of the servo circuit was kept constant during the above application of the pulse voltage.

The written information was read by controlling the distance between the tip electrode 102 and the surface of the recording medium 101 in the same manner as in the above writing procedure, subsequently driving the X-Y stage 114 with the output of the servo circuit 106 kept constant, and detecting the change of the tip current between the ON state and the OFF state to read the information directly; or otherwise the written information was read by driving the X-Y stage 114 with the servo circuit 106 kept working (the HOLD circuit being in an OFF state) and detecting the change of the output voltage of the servo circuit 106 between the ON state and the OFF state. In this Example, the tip current in the ON state was confirmed to be larger than that before the recording (or in the OFF state) by thousand times or more.

The erasing was conducted by controlling the distance between the tip electrode 102 and the surface of the recording layer 101 in the same manner as in the above writing, subsequently driving the X-Y stage 114 with the output of the servo circuit 106 kept constant and with the tip voltage of 8 volts which is higher than Vth-OFF, and tracing the recorded portions. Thereby, all the recorded state was found to have been erased and turned into the OFF state.

The same results were obtained by actuating the X-Y driving circuit 109 and driving the fine movement control mechanism 107 instead of driving the X-Y stage 114, and practicing the recording, reproducing and erasing information at intervals of 0.01μ. More specifically, after the recording, with the distance between the tip electrode and the surface of the recording layer 101 kept constant and with the output of the servo circuit 106 kept constant, the recorded portions were traced with the tip electrode by driving the fine movement control mechanism 107. As the results, the tip current was confirmed to change at intervals of a 0.01μ by a factor of thousand or more. Further, the recorded state at the intervals of 0.01μ was found to be all erased by tracing the recorded portions under the same conditions as above by employing the tip voltage of 8 volts. The above experiments of recording, reproducing, and erasing of information described above were repeated stably.

Stripes 1μ long were written in various pitches ranging from 0.001μ to 0.1μ by using the fine movement control mechanism 107 to measure the resolving power. Consequently, at writing pitches of 0.01μ or larger, the tip current were found to change consistently by a factor of a 1000 or more in accordance with the writing pitches. At the writing pitches of less than 0.01μ, however, the change of the tip current decreased gradually, and changes were hardly observed at the writing pitches of 0.001μ.

The LB films of SOAZ employed in the above experiments were prepared in the manner below.

An optical-polished glass substrate (substrate 104) was washed with a neutral detergent and trichlorothylene. Thereon, chromium was vapor-deposited in vacuum in a thickness of 50 Å as an underlying layer and further thereon gold was vapor-deposited in vacuum in a thickness of 400 Å to form the underlying electrode (gold electrode 103). Separately, a 0.2 mg/ml SOAZ solution in chloroform was spread on the surface of water at 20° C. to form a monomolecular film on the water surface. After the solvent evaporated off, the surface pressure of the monomolecular film was raised up to 20 mN/m. With this surface pressure kept constant, the aforementioned electrode-carrying substrate was dipped slowly into water at a rate of 5 mm/min so as to cross the water surface, and then pulled up to form a two-layered Y-type monomolecular built-up film.

As described above, the use of titanium carbide single crystal as the material of the tip electrode has made it feasible to conduct recording, reproducing, and erasing of information stably even when the pulse sweeping is repeatedly conducted. Thus, the stability of the apparatus has been greatly improved in comparison with the one employing a conventional tip such as an electrolytically polished tungsten tip.

In the present invention, a microtip which has sharp angle of the tip formed by three crystal faces and has high mechanical rigidity is prepared, with high reproducibility, by breaking a single crystal and anisotropically etching the face of the broken crystal.

Further, the use of the tip in a surface-observing apparatus or a recording-reproducing apparatus enables stable observation of images, or recording, reproducing and erasing of images, and improves greatly the durability and reliability of the apparatus.

What is claimed is:

1. A microtip having a tip portion formed by gathering of three crystal faces of a single crystal, at least one of the crystal faces being an etched face at and around the tip portion, wherein the crystal faces are planes of (211), (110) and (100).

2. A microtip produced by breaking and splitting a single crystal by applying a stress, and subjecting the face formed by breaking of the single crystal to anisotropic etching by utilizing facial orientation, thus forming a tip portion as a gathering point of three crystal faces of the single crystal, wherein the crystal faces are planes of (211), (110) and (100).

3. The microtip of claim 1 or claim 2, wherein the single crystal is composed of a carbide.

4. The microtip of claim 1 or claim 2, wherein the single crystal is composed a carbide selected from the group consisting of titanium carbide, tungsten carbide, and silicon carbide.

5. The microtip of claim 2, wherein the anisotropic etching is practiced by a dry process.

6. The microtip of claim 2, wherein the anisotropic etching is practiced by a wet process.

7. A surface-observing apparatus for observing a surface of a specimen, comprising a microtip placed in proximity to the specimen to be observed, and conducting the surface observation by moving the microtip and the specimen three-dimensionally while detecting a tunnel current flowing between the microtip and the specimen, or detecting an interatomic force exerted between the microtip and the specimen, said microtip having a tip portion formed by gathering of three crystal faces of a single crystal, at least one of the crystal faces being an etched face at and around the tip portion, wherein the crystal faces are planes of (211), (110) and (100).

8. An information-treating apparatus for writing information onto or reading information from a recording medium, comprising a microtip placed in proximity to the recording medium, and conducting the writing or reading by utilizing a tunnel current flowing between the microtip and the recording medium, or utilizing an interatomic force between the microtip and the recording medium, said microtip having a tip portion formed by gathering of three crystal faces of a single crystal, at least one of the crystal faces being an etched face at and around the tip portion, wherein the crystal faces are planes of (211), (110) and (100).

9. A surface-observing apparatus for observing a surface of a specimen, comprising a microtip placed in proximity to the specimen to be observed, and conducting the surface observation by moving the microtip and the specimen three-dimensionally while detecting a tunnel current flowing between the microtip and the specimen, or detecting an interatomic force exerted between the microtip and the specimen, said microtip being produced by breaking and splitting a single crystal by applying a stress, and subjecting the face formed by breaking of the single crystal to anisotropic etching by utilizing facial orientation, thus forming a tip portion as a gathering point of three crystal faces of the single crystal, wherein the crystal faces are planes of (211), (110) and (100).

10. An information-treating apparatus for writing information onto or reading information from a recording medium, comprising a microtip placed in proximity to the recording medium, and conducting the writing or reading by utilizing a tunnel current flowing between the microtip and the recording medium, or utilizing an interatomic force exerted between the microtip and the recording medium, said microtip being produced by breaking and splitting a single crystal by applying a stress, and subjecting the face formed by breaking of the single crystal to anisotropic etching by utilizing facial orientation, thus forming a tip portion as a gathering point of three crystal faces of the single crystal, wherein the crystal faces are planes of (211), (110) and (100).

* * * * *

UNITED STATES PATENT AND TRADEMARK OFFICE
CERTIFICATE OF CORRECTION

PATENT NO. : 5,245,187
DATED : September 14, 1993
INVENTOR(S) : TOSHIMITSU KAWASE, ET AL.

It is certified that error appears in the above-indentified patent and that said Letters Patent is hereby corrected as shown below:

COLUMN 1

Line 19, "Microtip" should read --Microtips-- and "STM" should read --STMs--.
    Line 20, "a" should be deleted.

COLUMN 7

Line 56, "of" should read --of a--.
    Line 67, "current" should read --currents--.
    Line 68, "a" should be deleted.

COLUMN 8

Line 31, "has" should read --has a--.
    Line 57, "composed" should read --composed of--.

Signed and Sealed this

Twenty-first Day of June, 1994

BRUCE LEHMAN

*Attest:*

*Attesting Officer*    *Commissioner of Patents and Trademarks*